(12) United States Patent
Cabillic (10) Patent No.: US 9,201,807 B2
(45) Date of Patent: Dec. 1, 2015

(54) METHOD AND SYSTEM FOR MANAGING VIRTUAL MEMORY

(75) Inventor: Gilbert Cabillic, Brece (FR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 2419 days.

(21) Appl. No.: 11/188,551

(22) Filed: Jul. 25, 2005

(65) Prior Publication Data

US 2006/0026563 A1 Feb. 2, 2006

(30) Foreign Application Priority Data

Jul. 27, 2004 (EP) .................................. 04291918

(51) Int. Cl.
| | |
|---|---|
| *G06F 9/45* | (2006.01) |
| *G06F 12/10* | (2006.01) |
| *G06F 9/455* | (2006.01) |
| *G06F 9/30* | (2006.01) |
| *G06F 12/08* | (2006.01) |

(52) U.S. Cl.
CPC ........ *G06F 12/1081* (2013.01); *G06F 9/30174* (2013.01); *G06F 9/45504* (2013.01); *G06F 12/0802* (2013.01); *G06F 2212/6012* (2013.01); *Y02B 60/1225* (2013.01)

(58) Field of Classification Search
CPC ............ G06F 9/45504; G06F 12/1081; G06F 12/0802; G06F 9/30174; G06F 2212/6012; Y02B 60/1225
See application file for complete search history.

(56) References Cited

U.S. PATENT DOCUMENTS

| | | | |
|---|---|---|---|
| 5,426,783 A | 6/1995 | Norrie et al. | |
| 6,066,181 A | 5/2000 | DeMaster | |
| 6,115,719 A | 9/2000 | Purdy et al. | |
| 6,192,368 B1 | 2/2001 | Gerard et al. | |
| 6,219,678 B1 | 4/2001 | Yelland et al. | |
| 6,321,323 B1 | 11/2001 | Nugroho et al. | |

(Continued)

OTHER PUBLICATIONS

Engel, Joshua, Programming for the Java virtual machine, 1999, Addison Wesley.*

(Continued)

*Primary Examiner* — Cheng-Yuan Tseng
*Assistant Examiner* — Alan Otto
(74) *Attorney, Agent, or Firm* — Ronald O. Neerinos; Frank D. Cimino (57) ABSTRACT

Methods, computer-readable media, and systems for virtual memory management using the JAVA programming language are provided. In some illustrative embodiments, a computer-readable medium storing a program that, when executed by a processor, performs a method for virtual memory management is provided. The method includes creating a representation of a page table, wherein each entry of the representation comprises a representation of a page descriptor, changing a field of a representation of a page descriptor in the representation of the page table, and updating a corresponding field in a page descriptor of a system level page table using the contents of the field in the representation of the page descriptor. Some illustrative embodiments provide a computer-readable medium storing a program that, when executed by a processor, performs a method for virtual memory management that includes creating a representation of a segment descriptor, changing a field of the representation of the segment descriptor, and updating a corresponding field in a system level segment descriptor using the contents of the field in the representation of the segment descriptor.

14 Claims, 7 Drawing Sheets

(56) References Cited

U.S. PATENT DOCUMENTS

| | | |
|---|---|---|
| 6,366,876 B1 | 4/2002 | Looney |
| 6,374,286 B1 | 4/2002 | Gee et al. |
| 6,594,708 B1 | 7/2003 | Slaughter et al. |
| 6,961,941 B1 * | 11/2005 | Nelson et al. ............. 719/319 |
| 7,159,223 B1 | 1/2007 | Comeau |
| 7,328,436 B2 * | 2/2008 | Perez ....................... 717/178 |
| 2002/0082823 A1 * | 6/2002 | Traut ......................... 703/27 |
| 2002/0099863 A1 | 7/2002 | Comeau et al. |
| 2002/0099902 A1 | 7/2002 | Comeau |
| 2002/0108025 A1 | 8/2002 | Shaylor |
| 2002/0161957 A1 | 10/2002 | Comeau et al. |
| 2003/0079213 A1 | 4/2003 | Cabillic et al. |
| 2003/0115441 A1 * | 6/2003 | Peleg et al. ................ 712/225 |

OTHER PUBLICATIONS

Kris Magnusson and Quinn Jensen, The Java Development Kit for NetWare, Novell AppNotes, 1996, p. 3.*

* cited by examiner

| 1 | public class Segment |
|---|---|
| 2 | { |
| 3 |    int Access; |
| 4 |    int Size; |
| 5 |    long BaseAddress |
| 6 | |
| 7 |    public Segment () |
| 8 |    { |
| 9 |       create_low_level_segment (); |
| 10 |    } |
| 11 | |
| 12 |    public native void UPDATESYSTEMVIEW (); |
| 13 |    private native void create_low-level_segment (); |
| 14 | } |

| 1 | public class Directory |
|---|---|
| 2 | { |
| 3 |    final int DIRECTORY_NUMBER_ENTRIES=1024; |
| 4 | |
| 5 |    PageTable Descriptor[ ] directory= new PageTableDescriptor |
| 6 |    [DIRECTORY_NUMBER_ENTRIES]; |
| 7 | |
| 8 |    public Directory() { |
| 9 |       create_lowlevel_directory(); |
| 10 |    } |
| 11 | |
| 12 |    public native void UPDATESYSTEMVIEW (); |
| 13 |    private native void create_low_level_directory (); |
| 14 | } |
| 15 | |
| 16 | public class PageTableDescriptor |
| 17 | { |
| 18 |    int size; |
| 19 |    int protection; |
| 20 |    boolean inMemory; |
| 21 |    boolean modified; |
| 22 |    PageTable pageTable; |
| 23 | } |

FIG. 7B

| 24 | public class PageTable |
| --- | --- |
| 25 | { |
| 26 |     final int PAGETABLE_NUMBER_ENTRIES=1024; |
| 27 | |
| 28 |     PageDescriptor[ ] pagetable= new PageDescriptor |
| 29 |     [PAGETABLE_NUMBER_ENTRIES]; |
| 30 | |
| 31 |     public PageTable() { |
| 32 |         create_lowlevel_pagetable(); |
| 33 |     } |
| 34 | |
| 35 |     public native void UPDATESYSTEMVIEW (); |
| 36 |     private native void create_low_level_pagetable (); |
| 37 | } |
| 38 | |
| 39 | public class PageDescriptor{ |
| 40 |     int size; |
| 41 |     int Address; |
| 42 |     char protection; |
| 43 |     boolean inMemory; |
| 44 |     boolean modified; |
| 45 |     boolean Access; |
| 46 | } |

| | |
|---|---|
| 1 | public class MyHandler extends InterruptHandler |
| 2 | { |
| 3 |    void Handler () { |
| 4 |       // Handler code |
| 5 |    } |
| 6 | |
| 7 |    public MyHandler() |
| 8 |    { |
| 9 |       InterruptTable.insertmeonlevel(this, (char) 2); |
| 10 |    } |
| 11 | } |
| 12 | |
| 13 | public abstract class InterruptHandler{ |
| 14 | { |
| 15 |    abstract void Handler(); |
| 16 | } |
| 17 | |
| 18 | public class InterruptTable |
| 19 | { |
| 20 |    static InterruptHandler [ ] interruptTable = new InterruptHandler [255]; |
| 21 | |
| 22 |    public static void insertmeonlevel (InterruptHandler O, char level) |
| 23 |    { |
| 24 |       interruptTable[level] = O; |
| 25 |    } |
| 26 | |
| 27 |    public static native UPDATESYSTEMVIEW(); |
| 28 | } |

METHOD AND SYSTEM FOR MANAGING VIRTUAL MEMORY

CROSS-REFERENCE TO RELATED APPLICATIONS

This application claims the benefit of European Patent Application No. 04291918.3, filed Jul. 27, 2004, incorporated by reference herein as if reproduced in full below. This application is related to co-pending and commonly assigned application Ser. No. 11/188,550, entitled, "Method And System For Multiple Object Representation," and Ser. No. 11/188,670, entitled "Method And System For Implementing Interrupt Service Routines," which are incorporated by reference herein.

BACKGROUND OF THE INVENTION

Mobile electronic devices such as personal digital assistants (PDAs) and digital cellular telephones are increasingly including applications written in the JAVA programming language. JAVA is a registered trademark of SUN Microsystems in Santa Clara, Calif. Many of these mobile devices include operating systems written in programming languages other than JAVA. To increase system stability, it would be desirable to implement all or part of the operating system using the JAVA programming language. However, manipulating low-level system data structures such as page tables, registers, interrupts, and task structures is difficult in JAVA. Such low-level structures typically are bit-based structures or complex structures with field sizes that cannot be represented directly in JAVA structures. For example, there is no way to create in JAVA a field of five bits that corresponds physically to only five bits in memory. Enhancements to improve the ability to manipulate low-level system data structures in JAVA applications are desirable.

SUMMARY

Accordingly, there are disclosed herein methods, computer-readable media, and systems for virtual memory management in JAVA. Some embodiments provide a computer-readable medium storing a JAVA program that, when executed by a processor, performs a method for virtual memory management comprising creating a JAVA representation of a page table, wherein each entry of the JAVA representation comprises a JAVA representation of a page descriptor, changing a field of a JAVA representation of a page descriptor in the JAVA representation of the page table, and updating a corresponding field in a page descriptor of a system level page table using the contents of the field in the JAVA representation of the page descriptor. Some embodiments provide a computer-readable medium storing a JAVA program that, when executed by a processor, performs a method for virtual memory management comprising creating a JAVA representation of a segment descriptor, changing a field of the JAVA representation of the segment descriptor, and updating a corresponding field in a system level segment descriptor using the contents of the field in the JAVA representation of the segment descriptor.

Other embodiments provide systems that comprise a processor, a JAVA virtual machine configured to execute on the processor, and a JAVA software program configured to execute on the JAVA virtual machine. The JAVA software programs are configured to perform the above-described methods.

Notation and Nomenclature

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention.

Although one or more of these embodiments may be preferred, the embodiments disclosed should not be interpreted, or otherwise used, as limiting the scope of the disclosure, unless otherwise specified. In addition, one skilled in the art will understand that the following description has broad application, and the discussion of any embodiments is meant only to be exemplary of those embodiments, and not intended to intimate that the scope of the disclosure, is limited to those embodiments.

The subject matter disclosed herein is directed to methods that provide multiple object representation in JAVA and methods for using multiple object representation. In embodiments of these methods, a JAVA class is created that provides both a JAVA representation and system representation of a system level data structure. The JAVA representation may be manipulated in JAVA and the system representation may be updated with the results of these manipulations by a method defined in the JAVA class. Conversely, the system representation may be manipulated by non-JAVA code (e.g., a device driver) and the JAVA representation may be updated with the results of these manipulations by a method defined in the JAVA class. Merely by way of example, the embodiments described herein are directed to a JAVA Virtual Machine implemented on a JAVA processor referred to herein as a JAVA Stack Machine. These embodiments should not be construed as limitations of the scope of this disclosure. The methods described are applicable to implementations of the JAVA Virtual Machine on other processors including general purpose processors.

Figure 1:
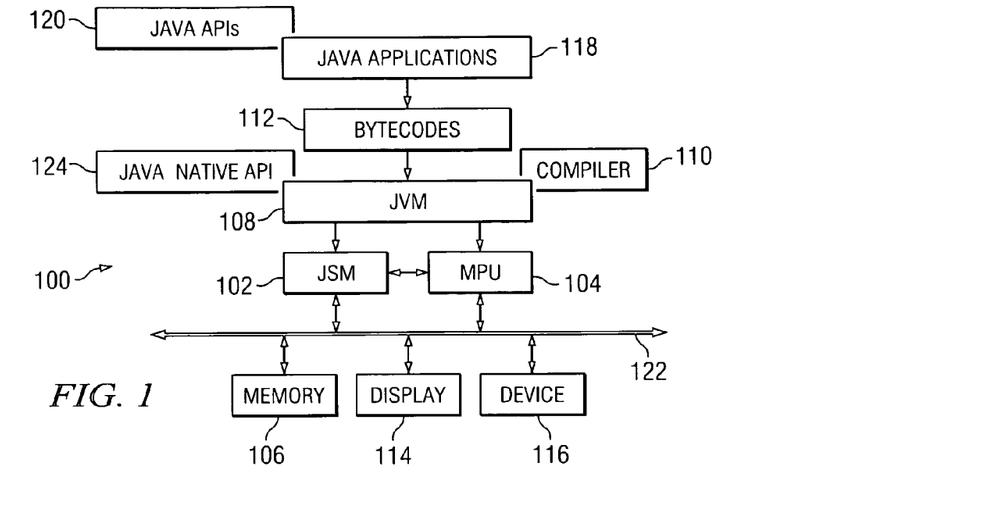
FIG. 1 shows a diagram of a system in accordance with embodiments of the invention.

FIG. 1 shows a system 100 in accordance with embodiments of the invention. As shown, the system may comprise at least two processors 102 and 104. Processor 102 may be referred to for purposes of this disclosure as a JAVA Stack Machine ("JSM") and processor 104 may be referred to as a Main Processor Unit ("MPU"). System 100 may also comprise memory 106, and a display 114 coupled to both the JSM 102 and MPU 104 via one or more busses 122. At least a portion of the memory 106 may be shared by both processors, and if desired, other portions of the memory 106 may be designated as private to one processor or the other. Other components such as disk drives and controllers (not specifically shown) may be included as desired for various applications.

System 100 also comprises a JAVA Virtual Machine ("JVM") 108, compiler 110, JAVA APIs 120, JAVA native APIs 124, and JAVA applications 118. The JVM may comprise a class loader, bytecode verifier, garbage collector, and a bytecode interpreter loop to interpret the bytecodes that are not executed on the JSM processor 102. The JAVA applications 118 are written in JAVA language source code and may comprise references to one or more classes of the JAVA Application Program Interfaces ("APIs") 120 and the JAVA native APIs 124. The JAVA native APIs 124 comprises interfaces to classes and methods implemented in other languages such as C++, C or assembler.

The JAVA source code is converted or compiled to a series of bytecodes 112, with each individual one of the bytecodes referred to as an "opcode." Bytecodes 112 are provided to the JVM 108, possibly compiled by compiler 110, and provided to the JSM 102 and/or MPU 104 for execution. In some embodiments, the JSM 102 may execute at least some JAVA bytecodes directly. When appropriate, however, the JVM 108 may also request the MPU 104 to execute one or more JAVA bytecodes not executed or executable by the JSM 102. In addition to executing compiled JAVA bytecodes, the MPU 104 also may execute non-JAVA instructions.

The system 100 may host an operating system (not specifically shown) which performs various functions such as virtual memory management, the system task management (i.e., a scheduler), and most or all other native tasks running on the system, management of the display 114, and receiving input from various devices 116. This operating system may be written in JAVA and may utilize the methods described herein for implementing interrupt handlers, managing virtual memory, and/or for providing a JAVA view of other system data structures (i.e., multiple object representation). As is described in more detail herein, embodiments of the method for multiple object representation comprise providing joint JAVA representation and system level representation of a system data structure with appropriate methods for updating each of the representations.

JAVA bytecodes perform stack-based operations. For example, an "IADD" (integer add) JAVA opcode pops two integers off the top of the stack, adds them together, and pushes the sum back on the stack. A "simple" opcode is one in which the JSM 102 may perform an immediate operation either in a single cycle (e.g., an IADD opcode) or in several cycles (e.g., "DUP2_X2"). A "complex" opcode is one in which several memory accesses may be required to be made within the JVM data structure for various verifications (e.g., NULL pointer, array boundaries).

A JSM processor 102 in accordance with embodiments of the invention may execute, in addition to the JAVA bytecodes, a second instruction set other than JAVA bytecodes. In some embodiments, the second instruction set may comprise register-based and memory-based operations rather than stack-based operations. This second instruction set complements the JAVA instruction set and, accordingly, may be referred to as a complementary instruction set architecture ("C-ISA"). By complementary, it is meant that some complex JAVA bytecodes may be replaced by a "micro-sequence" comprising C-ISA instructions. The execution of JAVA code may thus be made more efficient and run faster by replacing some opcodes with more efficient micro-sequences of C-ISA instructions. For example, the compiler 110 may scan a series of JAVA bytes codes and replace one or more of such bytecodes with an optimized code segment mixing CISA and bytecodes and which is capable of more efficiently performing the function(s) performed by the initial group of JAVA bytecodes. In at least this way, JAVA execution may be accelerated by the JSM 102.

The CISA instruction set comprises a plurality of instructions including a "PACK" instruction and an "UNPACK" instruction. The PACK instruction copies the contents of a source data field from the m lowest order bits of a source register to a destination data field of size m in a destination register at a specified location in the destination register. The UNPACK instructions copies the contents of a source data field of size m at a specified location in a source register to a destination register. The operation of the PACK and UNPACK instructions is explained in more detail in co-pending U.S. patent application Ser. No. 11/116,918, entitled "Unpack Instruction" and co-pending U.S. patent application Ser. No. 11/116,897 entitled "Pack Instruction," both of which are incorporated herein by reference.

Figure 2:
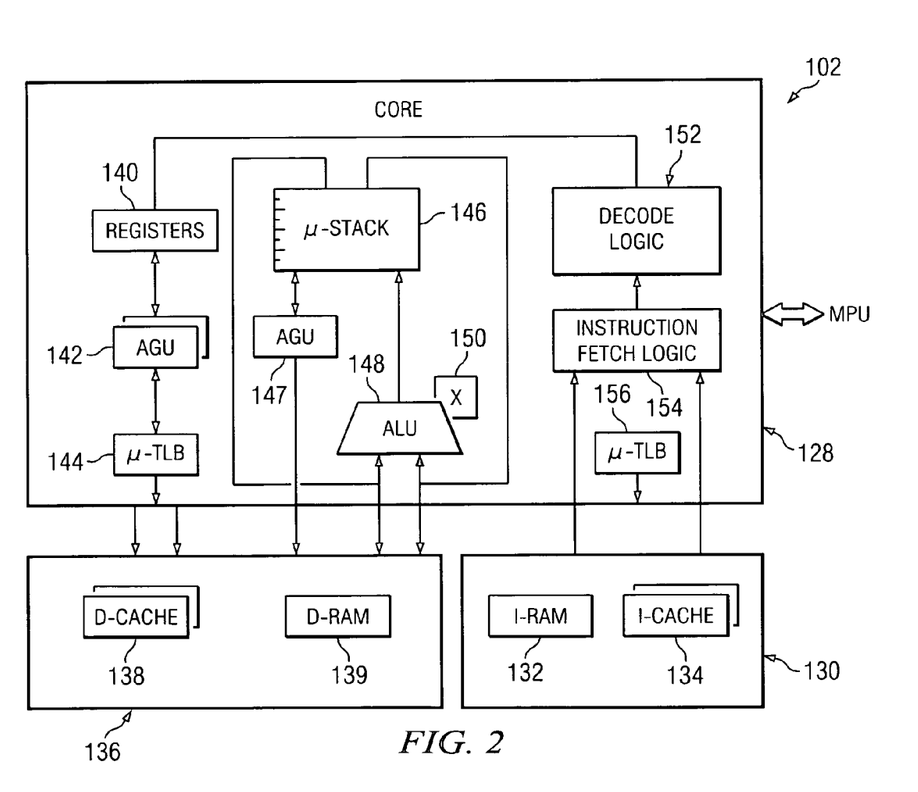
FIG. 2 shows a block diagram of the JSM of FIG. 1 in accordance with embodiments of the invention.

FIG. 2 shows an illustrative block diagram of the JSM 102. As shown, the JSM comprises a core 128 coupled to data storage 136 and instruction storage 130. The components of the core 128 preferably comprise a plurality of registers 140, address generation units ("AGUs") 142 and 147, micro-translation lookaside buffers (micro-TLBs) 144 and 156, a multi-entry micro-stack 146, an arithmetic logic unit ("ALU") 148, a multiplier 150, decode logic 152, and instruction fetch logic 154. Data pointed to by operands of opcodes may be retrieved from data storage 122 or from the micro-stack 146, and processed by the ALU 148. Instructions may be fetched from instruction storage 130 by fetch logic 154 and decoded by decode logic 152. The AGUs 142 may be used to calculate addresses for C-ISA instructions based, at least in part, on data contained in the registers 140. AGU 147 couples to the micro-stack 146 and may manage overflow and underflow conditions in the micro-stack 146. The micro-TLBs 144 and 156 perform the function of a cache for the address translation and memory protection information bits that are under the control of the operating system.

JAVA bytecodes may pop data from and push data onto the micro-stack 146, which micro-stack 146 comprises a plurality of gates in the core 128 of the JSM 102. The micro-stack 146 comprises the top n entries of a larger stack that is implemented in data storage 136. Although the value of n may be vary in different embodiments, in accordance with at least some embodiments the size n of the micro-stack may be the top eight entries in the larger, memory-based stack. By implementing the micro-stack 146 hardware in the core 128 of the processor 102, access to the data contained in the micro-stack 146 is very fast, although any particular access speed is not a limitation on this disclosure.

ALU 148 adds, subtracts, and shifts data. The multiplier 150 may be used to multiply two values together in one or more cycles. The instruction fetch logic 154 fetches instructions from instruction storage 130, which instructions may be decoded by decode logic 152. Because the JSM 102 is configured to process instructions from at least two instruction sets, the decode logic 152 comprises at least two modes of operation, one mode for each instruction set. As such, the decode logic unit 152 may comprise a JAVA mode in which JAVA bytecodes may be decoded, and a C-ISA mode in which micro-sequences of C-ISA instructions may be decoded.

The data storage 136 comprises data cache ("D-cache") 138 and data random access memory ("D-RAM") 139. The stack (excluding the micro-stack 146), arrays and non-critical data may be stored in the D-cache 138, while JAVA local variables, critical data and non-JAVA variables (e.g., C, C++) may be stored in D-RAM 139. The instruction storage 130 may comprise instruction RAM ("I-RAM") 132 and instruction cache ("I-CACHE") 134. The I-RAM 132 may be used for opcodes or micro-sequences, and the I-CACHE 134 may be used to store other types of JAVA bytecode and mixed JAVA/C-ISA instructions.

Figure 3:
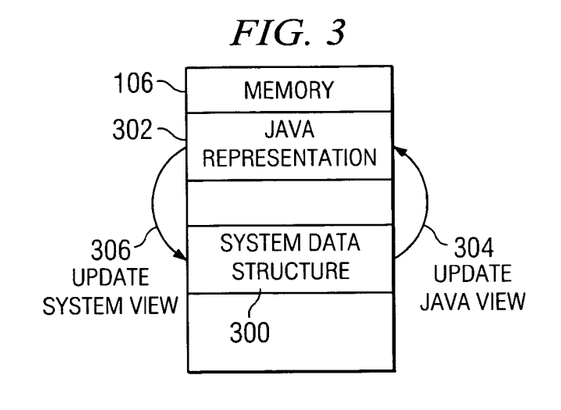
FIG. 3 illustrates multiple object representation in accordance with embodiments of the invention.

FIG. 3 illustrates a method for multiple object representation in accordance with embodiments of the invention. In this method, a JAVA class is defined that comprises a JAVA representation of a system level data structure. Examples of such a JAVA class may be seen in FIGS. 5, 7A, 7B, and 9 and are described in more detail below. In some embodiments, this JAVA class may comprise a constructor that invokes a JAVA native method to create the system level data structure. In other embodiments, the system level data structure may be pre-defined. The JAVA class definition may comprise one or both of two JAVA native methods for updating the system level data structure and/or the JAVA representation. One of these JAVA native methods, referred to herein as UpdateSystemView, updates the system level data structure from the contents of the JAVA representation. The other JAVA native method, referred to herein as UpdateJavaView, updates the JAVA representation from the contents of the system level data structure.

Using this class definition, an object 302 of the type represented by the JAVA class may be instantiated in memory 106 by the operating system or by one of the JAVA applications 118. In some embodiments, when the object is instantiated, a constructor is invoked to create the system level data structure 300 corresponding to the JAVA representation. In other embodiments, the system level data structure 300 may be pre-existing. The operating system or application may use JAVA operations to change one or more fields in the JAVA representation of the system level data structure and then invoke the UpdateSystemView method 306 to update the system level data structure 300. If the contents of the system level data structure are changed, the operating system or application may invoke the UpdateJavaView method 304 to update the JAVA representation 302.

Figure 5:
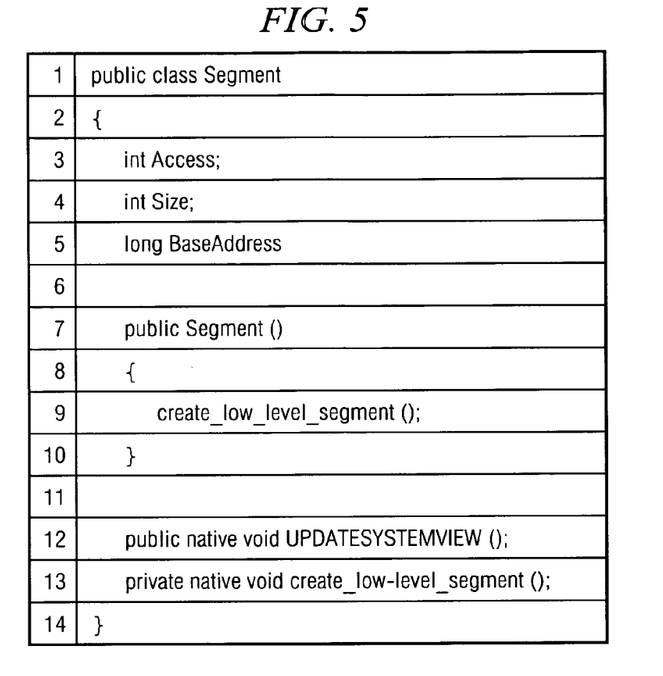
FIGS. 5, 7A, 7B, and 9 show JAVA source code examples of methods in accordance with embodiments of the invention.

In various embodiments, the JAVA representation comprises JAVA fields representing each field of the system level data structure (e.g., the class Segment of FIG. 5). Because JAVA fields are based on JAVA primitive types, the size of the JAVA field may be larger than the size of the corresponding field in the system level data structure. For example, if a field in the system level data structure is five bits in size, the JAVA field corresponding to this field may be defined as a JAVA type that corresponds to the byte size of the processor architecture (e.g., byte). If a field is 13 bits in size, the corresponding JAVA instance variable may be defined as a JAVA type that corresponds to the word size of the processor architecture (e.g., int).

In such embodiments, the UpdateSystemView method copies only the relevant bits of the JAVA field to the corresponding field in the system level data structure and the UpdateJavaView method copies the bits of the field in the system level data structure into the least significant bits of the corresponding JAVA field. In the latter case, sign extension is performed for JAVA types byte, short, int, and long and zero extension is performed for the JAVA type char. Embodiments of the UpdateSystemView method and the UpdateJavaView method may be implemented using the Pack instruction or the Unpack instruction, respectively, of the JSM 102. In addition, in some embodiments, the UpdateSystemView and the UpdateJavaView methods copy every field of the JAVA or system representation, respectively, to the corresponding field in the system or JAVA representation, respectively. In other embodiments, the UpdateSystemView method and the UpdateJavaView methods only copy data from the fields which have changed in the JAVA or system representation, respectively.

In other embodiments of the multiple object representation method, the JAVA representation does not replicate fields of a system level data structure. Instead, the JAVA representation may contain data that is used in conjunction with a system level data structure and may contain data that is used in conjunction with the system level data structure (e.g., the class InterruptTable of FIG. 9). In such embodiments, the UpdateSystemView method performs the operations required to make the data accessible using the system level data structure (e.g., generating a JVM code sequence that used the data and placing the address of the code sequence in a field of the system level data structure).

Figure 4:
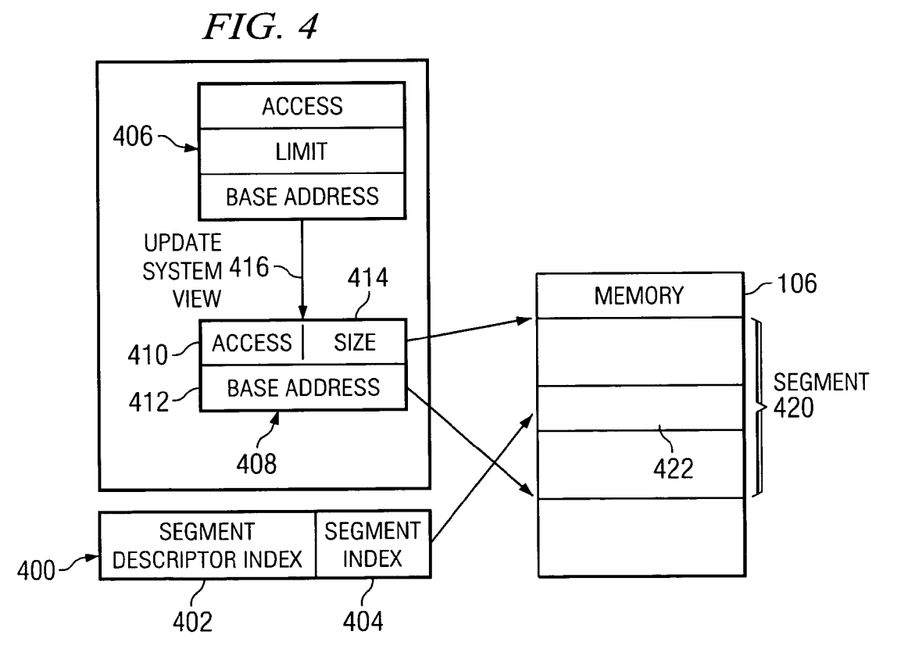
FIGS. 4, 6, and 8 show examples of using multiple object representation in accordance with embodiments of the invention.
Figure 6:
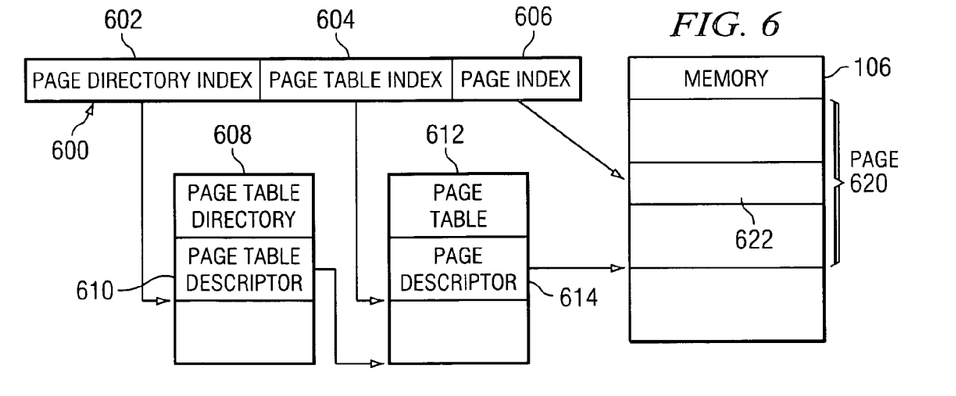
Figure 7A:
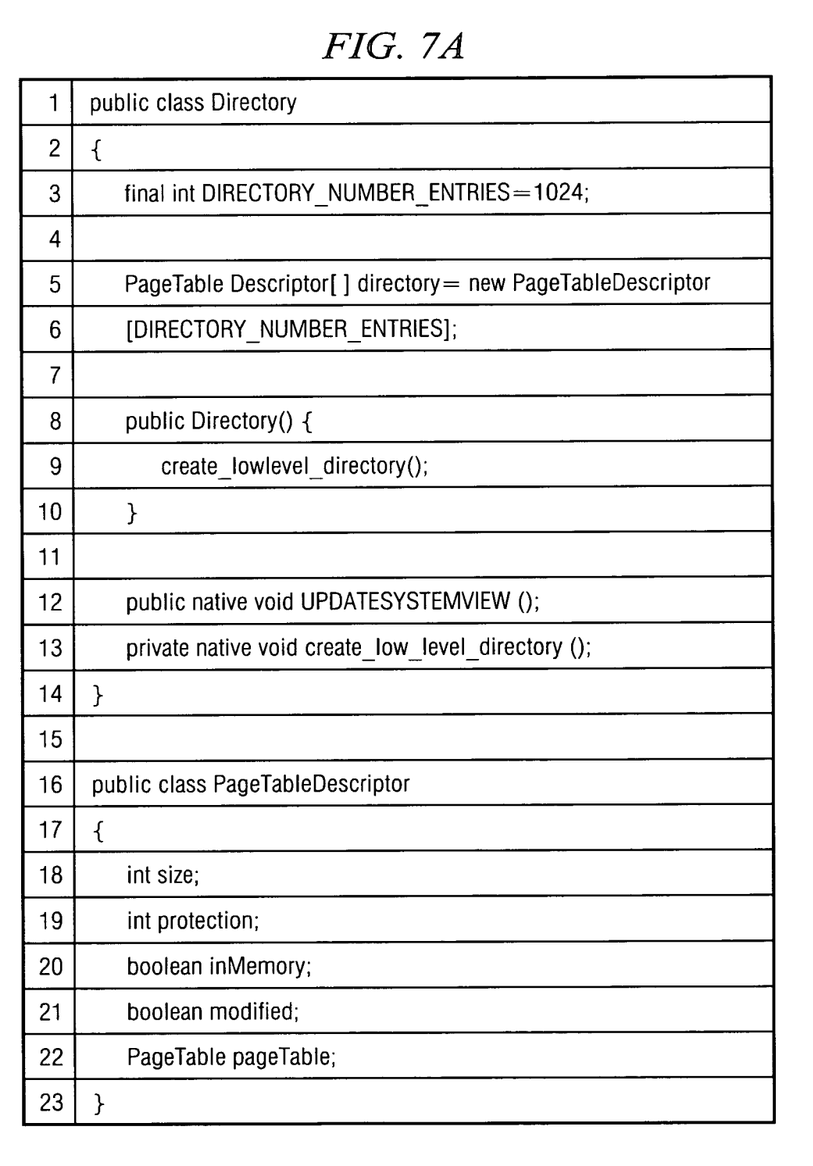
Figure 7B:
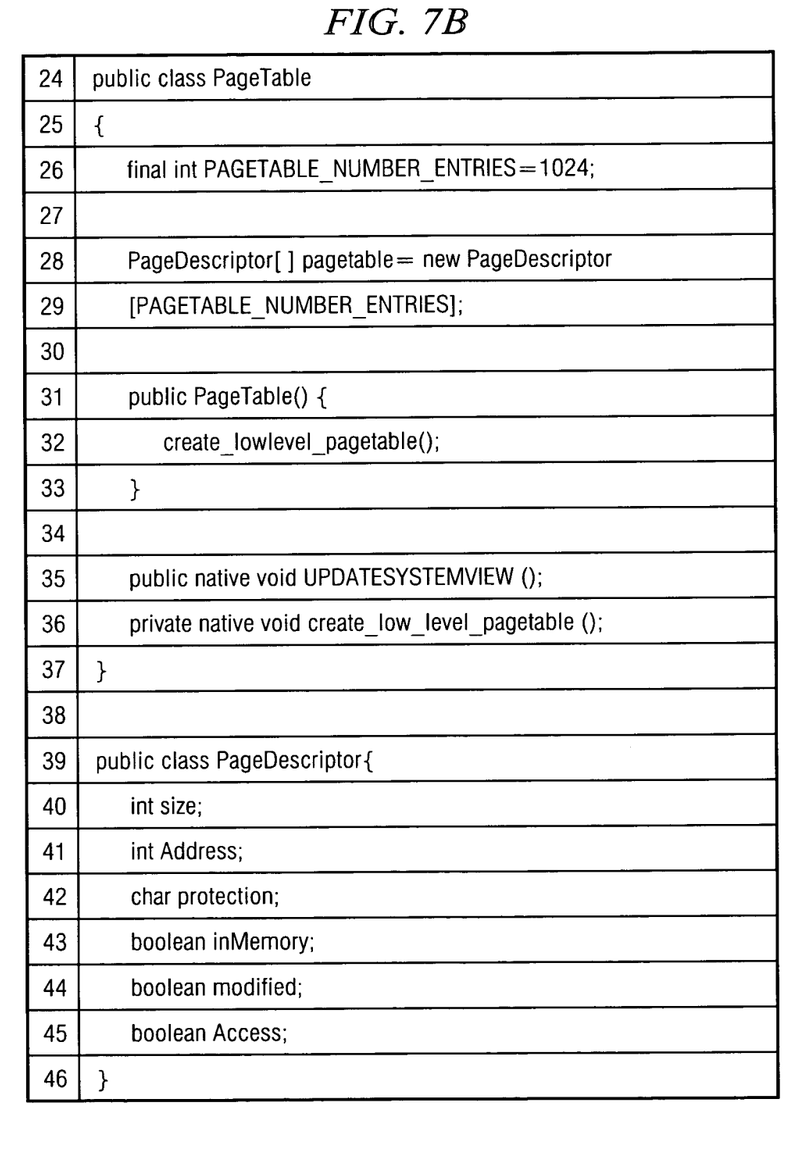
Figure 8:
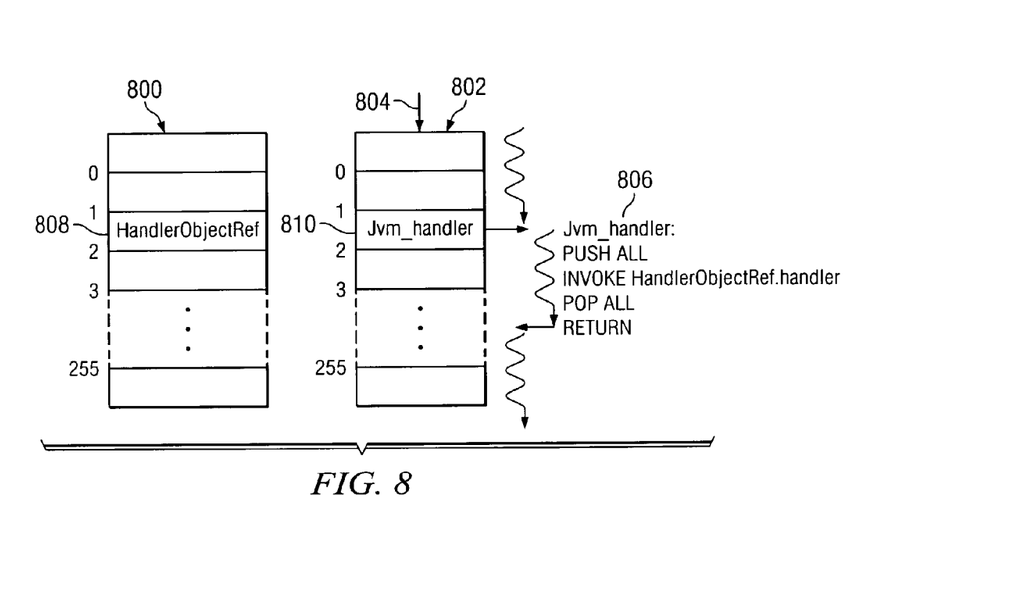
Figure 9:
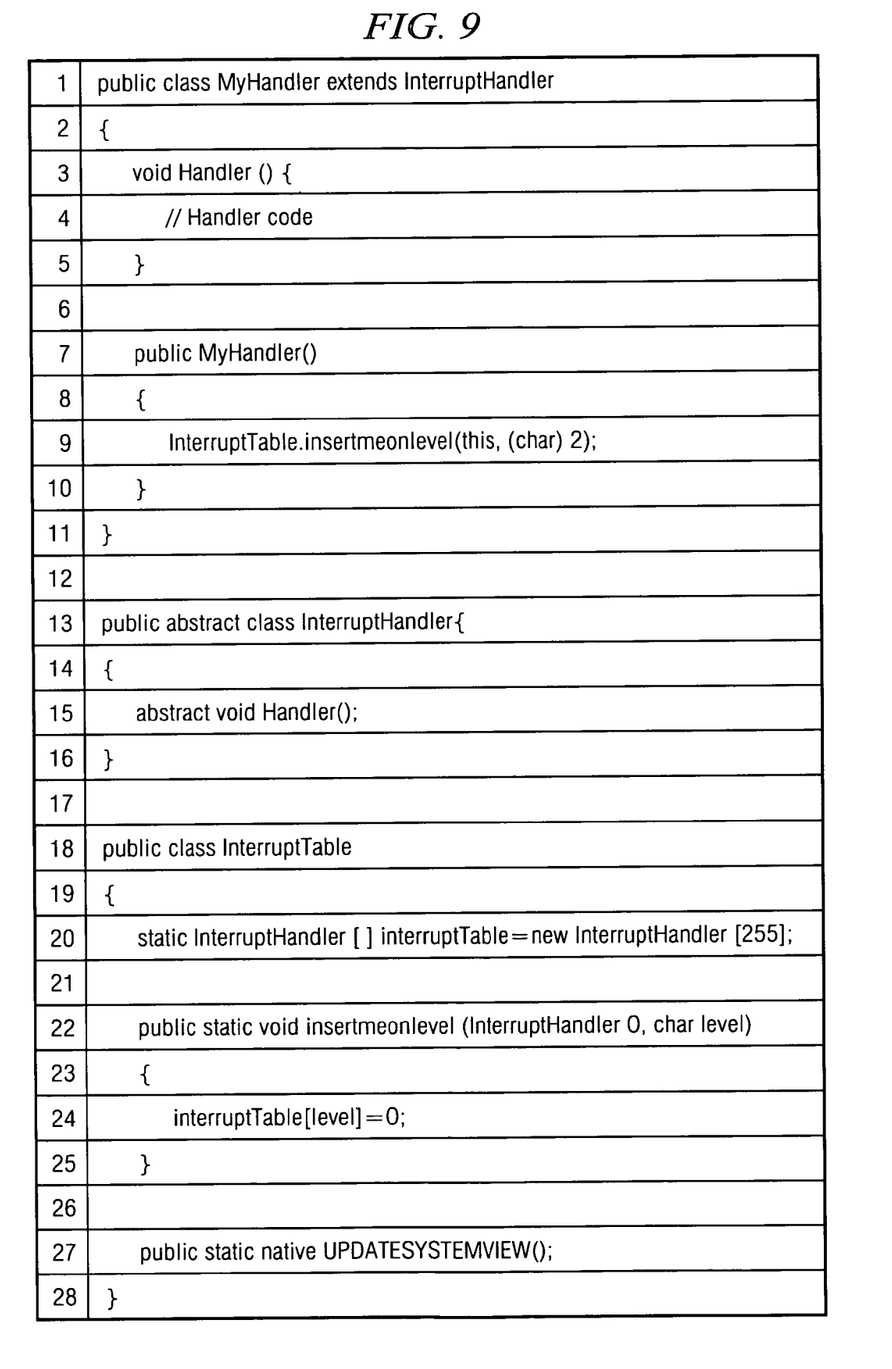

Using the above described methods for multiple object representation, it is possible to represent any type of system level data structure in JAVA, thus making the implementation of operating system functions such as virtual memory management and interrupt handling in JAVA easier. FIGS. 4-9 present examples of using multiple object representation for the implementation of virtual memory management and interrupt handling in accordance with embodiments of the invention. FIGS. 4 and 5 illustrate the use of multiple object representation to implement an object that represents a segment descriptor in a virtual memory management system based on segmentation. FIGS. 6, 7A, and 7B illustrate the use of multiple object representation to implement the low-level structures used in a virtual memory management system based on paging. FIGS. 8 and 9 illustrate the use of multiple object representation to implement interrupt service routines. FIGS. 5, 7A, 7B, and 9 present example JAVA code. The JAVA code is presented by way of example only. Other implementations are possible and fall within the scope of this disclosure.

A virtual memory management system allows processes to use a memory address space that exceeds the size of the physical memory of the computer system. The virtual address space of a process is divided into portions, i.e., segments or pages, and the operating system moves these portions between physical memory and secondary storage as needed during the life of the process. At any point in time, portions of the virtual memory space of multiple processes may occupy physical memory.

In general, a virtual memory management system is implemented with a combination of operating system software and hardware comprising at least a memory management unit. When an executing process accesses a memory location, the address specified by the process, i.e., the virtual address, is passed to the MMU. The MMU uses one or more address translation data structures (e.g., page tables, page table directories, page descriptors, and/or segment descriptors), explained in more detail below, to either translate the virtual address to a physical address or to determine that the data corresponding to the virtual address is currently not in physical memory. In the latter case, the MMU generates a virtual memory exception to notify the operating system to handle the situation.

The operating system is responsible for: (1) determining what portions of the virtual memory space of a process are maintained in physical memory and what portions are placed in secondary storage; (2) maintaining the address translation data structures used by the MMU; and (3) handling virtual memory exceptions. Such handling includes freeing up or allocating space in physical memory to hold the missing information, possibly copying a portion of the virtual memory space of another process to secondary storage to make room for the missing information, bringing the relevant information in from secondary storage, and updating the address translation data structures.

A virtual memory management system may be based on segmentation, paging or some combination of the two. FIGS. 4 and 5 illustrate the use of multiple object representation to implement a JAVA class that represents a segment descriptor of a virtual memory management system based on segmentation. In this type of virtual memory management system, the virtual address space of each process is divided into blocks of contiguous memory called segments. In general, each segment has a particular use. These segments may vary in size and a process may have one or more segments. For example, a process may have a code segment storing executable code, a data segment holding the data used or created by the code segment, a stack segment used exclusively for storing a stack used by the process, and/or a heap segment used exclusively for heap storage by the process.

In a segmented virtual memory management system, a virtual address 400 is comprised of a segment descriptor index 402 and a segment index 404. The relative sizes of the segment descriptor 402 and the segment index 404 depend on the architecture of the memory management unit ("MMU") managing memory 106. A segment descriptor index 402 identifies the segment descriptor 408 in a segment table (not specifically shown) that corresponds to the memory segment 420 containing the physical address 422 corresponding to the virtual address 400. The segment index 404 contains the offset of that physical address 422 within the memory segment 420.

A new segment descriptor is created by the operating system for each segment required by a process. The format of a segment descriptor may vary depending on the architecture of the MMU. In some embodiments, the segment descriptor 408 may be comprised of a base address field 412, a size field 414, and an access field 410. The base address 412 contains the starting physical address of the memory segment 420. The size field contains the size of the segment 420. The contents of the access field 410 may vary depending on the architecture of the MMU. For example, the access field 410 may contain bits fields defining the access attributes (e.g., read, write, execute) of the segment 420. The access field 410 may also contain bits for managing the swapping of the segment to secondary storage (not specifically shown) such as a bit that is set if the segment is currently in memory 106 and a bit that is set if the segment 420 is modified.

FIG. 5 presents an example of a JAVA class for creating and managing a segment descriptor 408 in JAVA using the previously described method for multiple object representation. A class Segment is defined that comprises a JAVA view of the segment descriptor (lines 3-5) and a constructor that invokes a JAVA native method to create the system representation of the segment descriptor (lines 7-10) that is used by the MMU.

The class also comprises a native method UPDATESYSTEMVIEW (line 12) that may be called to update the system representation of the segment descriptor if the fields of the JAVA view are changed. This native method contains the code required to copy the contents of the JAVA fields to the corresponding fields in the system representation.

In some embodiments, the operating system of system 100 may use the above class for virtual memory management based on segmentation. For example, when the operating system allocates a segment 420 for a process, the operating system may instantiate a new segment object 406 using the Segment class. A JAVA object 406 is allocated that contains the JAVA representation of the segment descriptor 408. The constructor is executed to allocate the segment descriptor 408. The operating system may then use JAVA operations to initialize the access, size, and base address fields of the JAVA representation 406 to correspond to the new segment 420. Once these fields are initialized, the operating system may call the UPDATESYSTEMVIEW method 416 to copy the values in the JAVA representation 406 to the corresponding fields in the segment descriptor 408. The MMU may then use the segment descriptor 408 for virtual address translation.

The operating system may also cause the segment 420 to be swapped out of physical memory to secondary storage if the physical memory allocated to the segment 420 is needed by another process. If the segment 420 is removed from physical memory 106, the operating system may use JAVA operations to update the bit in the access field of the JAVA view that indicates whether or not the segment is in memory and then call UPDATESYSTEMVIEW to update the segment descriptor 408. When the segment 420 is again accessed by the process owning the segment, the MMU will signal a segment exception to the operating system. The operating system causes the segment 420 to be swapped back into the physical memory 106 but not necessarily at the same base address. When the segment 420 is placed in physical memory 106 again, the operating system may use JAVA operations to update the bit in the access field of the JAVA view 408 to indicate that the segment 420 is in physical memory 106 and to update the base address field with the current physical address of the segment 420. The operating system then calls UPDATESYSTEMVIEW to update the segment descriptor 408.

FIGS. 6, 7A, and 7B illustrate the use of multiple object representation to implement the low-level structures used in a virtual memory management system based on paging. In this type of virtual memory management system, the virtual address space of each process is divided into equal sized blocks of contiguous memory called pages. In some embodiments, a virtual address 600 is comprised of a page directory index 602, a page table index 604 and a page index 606. The relative sizes of the page directory index 602, the page table index 604, and the page index 606 depend on the architecture of the memory management unit ("MMU") managing memory 106. The page directory index 602 identifies the page table descriptor 610 in a page table directory 608 of a page table 612. The page table index 604 identifies the page descriptor 614 in the page table 612 that corresponds to the memory page 620. The page index 606 contains the offset of the physical address 622 that corresponds to the virtual address 600 within the memory page 620. The MMU translates the virtual address 600 to the physical address 622 using the entries in the page table directory 608 and the page table 612 specified in the virtual address 600.

FIGS. 7A and 7B present examples of JAVA classes for creating and managing page tables and page table directories in JAVA using the previously described method for multiple object representation. In these examples, a minimal number of fields are comprised in the system level data structures for page table descriptors and page descriptors for purposes of illustration. As one of ordinary skill in the art would know, these descriptors may vary in complexity. Representations of the more complex descriptors fall within the scope of this disclosure.

Referring first to FIG. 7B, a class PageDescriptor is defined (lines 39-46). This class defines JAVA instance variables or fields to represent each field of a system level representation of a page descriptor 614 (lines 40-45). In some embodiments, these fields comprise a base address field, a size field, an access field, a Boolean field for indicating whether the page is in memory, a Boolean field for indicating if the page has been modified, and a protection field. The address field contains the physical address of the page. The size field contains the size of the page. The contents of the access field may vary depending on the architecture of the MMU. For example, the access field may contain bits fields defining the access attributes (e.g., read, write, execute) of the page. The protection field contains bits specifying the protection level of the page.

A class PageTable is defined (lines 24-37) for use in creating page tables (e.g., page table 612). This class defines a JAVA representation of a page table that contains a predefined number of entries of type PageDescriptor (line 28). That is, each entry of the JAVA representation of a page table is comprised of the fields defined in the class PageDescriptor (lines 39-46. The class also comprises a constructor that creates the system level representation of a page table 612 (lines 31-33). In addition, the class comprises a native JAVA method, UPDATSYSTEMVIEW, for updating the system representation of the page table from the entries of the JAVA representation of the page table (line 35).

Referring now to FIG. 7A, a class PageTableDescriptor (lines 16-230) is defined. This class defines JAVA instance variables or fields to represent each field of a system level representation of a page table descriptor 610 (lines 18-22). In some embodiments, these fields comprise a size field, a protection field, a Boolean field indicating if the page table is in physical memory or not, a Boolean field indicating whether the page table has been modified, and a field containing an object reference to a page table object. The size field contains the size of the page table. The protection field contains bits specifying the protection level of the page table.

A class Directory is defined (lines 1-14) for use in creating page table directories (e.g., page table directory 608). This class defines a JAVA representation of a page table directory that contains a predefined number of entries of type PageTableDescriptor (lines 5-6). That is, each entry of the JAVA representation of a page table directory is comprised of the five fields defined in the class PageTableDescriptor (lines 18-22). The class also comprises a constructor that creates the system level representation of a page table directory 608 (lines 8-10). In addition, the class comprises a native JAVA method, UPDATSYSTEMVIEW, for updating the system representation of the page table directory from the entries of the JAVA representation of the page table directory (line 12).

In some embodiments, the operating system of system 100 may use the above paging classes for virtual memory management. For example, when the operating system loads a process initially, it may use the class Directory to instantiate a JAVA representation of a page table directory and a system level representation of the page table directory for the process. The JAVA representation of the page table directory is allocated sufficient memory to hold a predetermined number (i.e., DIRECTORY_NUMBER_ENTRIES) of page table descriptor entries and the constructor is executed to allocate the system level representation of the page table directory 608. Each entry of the JAVA representation of the page table directory is of type PageTableDescriptor.

The operating system may also use the PageTable class to create one or more JAVA representations of page tables for the process. Each JAVA representation of a page table is allocated sufficient memory to hold a predetermined number (i.e., PAGETABLE_NUMBER_ENTRIES) of page descriptor entries and the constructor is executed to allocate the system level representation of the page table 612. Each entry of the JAVA representation of the page table is of type PageDescriptor. The operating system may use JAVA operations to initialize the fields of the appropriate page table descriptors in the JAVA representation of the page table directory as new page tables are allocated for the process. The operating system may invoke the UPDATESYSTEMVIEW method of the class Directory to update the system level representation of the page table directory with new page table descriptors.

The operating system may also use JAVA operations to initialize the fields of the appropriate page descriptors in the JAVA representation of the page tables as new pages are allocated for the process. Once these fields are initialized, the operating system may invoke the UPDATESYSTEMVIEW method of the class PageTable to update the system level representation of a page table with the new page descriptors.

The operating system may also cause a page 620 to be swapped out of physical memory 106 to secondary storage if the physical memory allocated to the page 620 is needed by another process. If the page 620 is removed from physical memory 106, the operating system may use JAVA operations to update the inMemory field of the JAVA representation of the page descriptor and then call the UPDATESYSTEMVIEW method of the class PageTable to update the system level representation of the page descriptor 614. When the page 620 is again accessed by the process owning the page, the MMU will signal a page exception to the operating system. The operating system causes the page 620 to be swapped back into the physical memory 106 but not necessarily at the same base address. When the page 620 is placed in physical memory 106 again, the operating system may use JAVA operations to update the inMemory field of the JAVA representation of the page descriptor to indicate that the page 620 is in physical memory 106 and to update the address field with the current physical address of the page 620. The operating system may then call UPDATESYSTEMVIEW to update the system level representation of the page descriptor 614. The operating system may manage the swapping of page tables similarly.

FIGS. 8 and 9 illustrate the use of multiple object representation to implement interrupt service routines for the system 100. The MPU 104 and JSM 102 may initiate a software routine in response to an asynchronous electronic event, e.g., a signal from a device 116. This event, referred to as an interrupt, is signaled to the operating system via an interrupt request ("IRQ") 804. The operating system executes special interrupt code 806 to save the current context, to process an interrupt service routine, i.e., interrupt handler, which handles the interrupt, and to restore the saved context. The address of this handler, i.e., the interrupt vector, is generally stored in memory 106 in a table of interrupt vectors 802. This special interrupt code 806 comprises an instruction sequence such as a JVM 108 opcode sequence as illustrated, a C-ISA instruction sequence, a native code instruction sequence, and/or instructions of a non-JAVA virtual machine (e.g., a .net virtual machine that defines its own instruction set).

FIG. 9 presents examples of JAVA classes that may be used by the operating system to create the entries in the interrupt vector table 802. A class InterruptTable is defined (lines 18-28). This class defines a JAVA representation of the interrupt vector table 800 as an array with a predetermined number of entries corresponding to the system level representation of the interrupt vector table 802. A method, insertmeonlevel, is comprised in the class (lines 22-25). This method is used to add JAVA interrupt handlers to the JAVA representation of the interrupt vector table 800. The class also comprises a JAVA native method, UPDATESYSTEMVIEW, for creating entries in the system level representation of the interrupt vector table 802 that access the JAVA interrupt handlers (line 27). The operation of insertmeonlevel and UPDATESYSTEMVIEW are explained in more detail below.

An abstract class InterruptHandler is also defined (lines 13-16). This class comprises an abstract method Handler (line 15). Each JAVA interrupt handler is defined as an extension of this class and must implement a method with the name Handler. In addition, each entry of the JAVA representation of the interrupt vector table 800 is a reference to an object of type InterruptHandler.

The class MyHandler is an example level 2 interrupt handler definition (lines 1-11). This class extends the class InterruptHandler (line 1) and comprises the required definition of the method Handler (lines 3-5). While not specifically shown here, the Handler method contains JAVA code to be executed when a level 2 interrupt is signaled. The class comprises a method MyHandler that is used to after an object of type MyHandler is instantiated to insert a reference to the object in the JAVA representation of the interrupt vector table 800 at an entry corresponding to the interrupt level of the handler (lines 7-10). The MyHandler method invokes the insertmeonlevel method of InterruptTable class to perform the insertion. In this example, the handler object is defined to handle a level 2 interrupt so it will be inserted at entry two 808 in the JAVA representation of the interrupt vector table 800.

The operating system uses the class InterruptTable to instantiate an InterruptTable object. This InterruptTable object contains the JAVA representation of the interrupt vector table 800. To create an interrupt vector in the system level representation of the interrupt vector table 802, the operating system uses the class MyHandler to instantiate a handler object and invokes the MyHandler method to insert a reference to the handler object in the JAVA representation of the interrupt vector table 800 at the entry corresponding to interrupt level 2 808. The operating system then invokes UPDATESYSTEMVIEW to create an interrupt vector in the system level interrupt vector table 802 at the entry corresponding to interrupt level 2 810. UPDATESYSTEMVIEW generates a JVM 108 opcode sequence 806, Jvm_handler, that invokes the Handler method of the MyHandler object and stores a reference to the Jvm_handler in the system level interrupt vector table 802 at the entry corresponding to interrupt level 2 810. Then, when a level two interrupt 804 is signaled in system 100, the interrupt vector corresponding to the interrupt level two 810 in the system level interrupt table 802 is selected. The Jvm_handler 806 is executed, which invokes the JAVA handler Handler of the MyHandler object to actually handle the interrupt.

Figure 10:
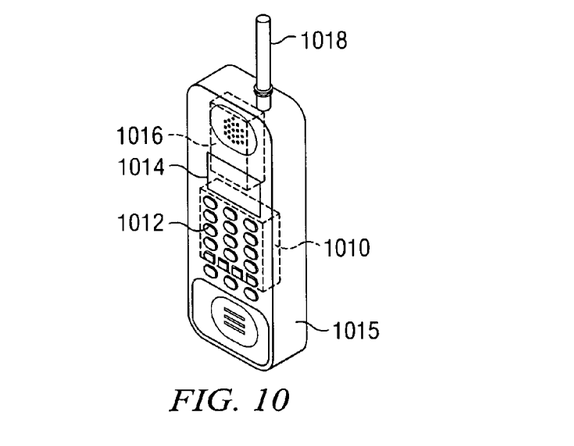
FIG. 10 depicts an illustrative embodiment of the system described herein.

The system 100 may be implemented as a mobile device 1015 such as that shown in FIG. 10. As shown, the mobile device 1015 comprises an integrated keypad 1012 and display 1014. The JSM processor 102 and MPU processor 104 and other components may be comprised in electronics package 1010 connected to the keypad 1012, display 1014, and radio frequency ("RF") circuitry 1016. The RF circuitry 1016 may be connected to an antenna 1018.

While the various embodiments of the invention have been shown and described, modifications thereof can be made by one skilled in the art without departing from the spirit and teachings of the invention. The embodiments described herein are illustrative only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A non-transitory computer-readable medium storing a software program that, when executed by a processor, performs a method for virtual memory management comprising:
   creating a representation of a page table for a process by instantiating a page table object using a JAVA programming language class representing a system level page table, wherein each entry of the page table representation comprises a representation of a page descriptor and the JAVA programming language class comprises a JAVA programming language method for updating the system level page table; and
   changing a field of a page descriptor representation in the page table representation and a corresponding field in a page descriptor of the system level page table during execution of the process when a virtual page corresponding to the page descriptors is removed from memory and when the virtual page is placed in memory,
   wherein the JAVA programming language method is executed to change the corresponding field using contents of the field in the page descriptor representation.

2. The non-transitory computer-readable medium of claim 1, the method further comprising:
   creating a representation of a page table directory for the process by instantiating a page table directory object using a JAVA programming language class representing a system level page table directory, wherein each entry of the page table directory representation comprises a representation of a page table descriptor and the JAVA programming language class representing the system level page table directory comprises a JAVA programming language method for updating the system level page table directory;
   changing a field of a page table descriptor representation in the page table directory representation and a corresponding field in a page table descriptor of the system level page table directory during execution of the process,
   wherein the JAVA programming language method for updating the system level page table directory is executed to change the corresponding field in the page table descriptor of the system level page table directory using contents of the field in the page table descriptor representation.

3. The non-transitory computer-readable medium of claim 1, wherein
   the JAVA programming language class comprises a constructor to create the system level page table, and
   instantiating the page table object further comprises executing the constructor, wherein the system level page table is created.

4. The non-transitory computer-readable medium of claim 2, wherein
   the JAVA programming language class representing the system level page table directory comprises a constructor to create the system level page table directory, and instantiating the page table directory object further comprises executing the constructor, wherein the system level page table directory is created.

5. A system, comprising:
a processor;
a memory;
a virtual machine configured to execute a JAVA programming language configured to execute on the processor; and
a software program configured to execute on the virtual machine, wherein the software program is configured
to create a representation of a page table for a process by instantiating a page table object using a JAVA programming language class representing a system level page table, wherein each entry of the page table representation comprises a representation of a page descriptor and the JAVA programming language class comprises a JAVA programming language method for updating the system level page table, and
to change a field of a page descriptor representation in the page table representation and a corresponding field in a page descriptor of the system level page table during execution of the process when a virtual page corresponding to the page descriptors is removed from the memory and when the virtual page is placed in the memory, wherein the JAVA programming language method is executed to change the corresponding field using contents of the field in the page descriptor representation.

6. The system of claim 5, wherein the software program is further configured
to create a representation of a page table directory for the process by instantiating a page table directory object using a JAVA programming language class representing a system level page table directory, wherein each entry of the page table directory representation comprises a representation of a page table descriptor and the JAVA programming language class representing the system level page table directory comprises a JAVA programming language method for updating the system level page table directory, and
to change a field of a page table descriptor representation in the page table directory representation and a corresponding field in a page table descriptor of the system level page table directory during execution of the process,
wherein the JAVA programming language method for updating the system level page table directory is executed to change the corresponding field in the page table descriptor of the system level page table directory using contents of the field in the page table descriptor representation.

7. The system of claim 5, wherein
the JAVA programming language class comprises a constructor to create the system level page table, and
instantiating the page table object further comprises executing the constructor, wherein the system level page table is created.

8. The system of claim 6, wherein
the JAVA programming language class representing a system level page table directory comprises a constructor to create the system level page table directory, and instantiating the page table directory object further comprises executing the constructor, wherein the system level page table directory is created.

9. The system of claim 5, wherein the system comprises a mobile device.

10. A non-transitory computer-readable medium storing a software program that, when executed by a processor, performs a method for virtual memory management comprising:
creating a representation of a segment descriptor by instantiating an object using a JAVA programming language class representing a system level segment descriptor, wherein the JAVA programming language class comprises a JAVA programming language native method for updating the system level segment descriptor;
changing a field of the segment descriptor representation; and
executing the JAVA programming language native method to change a corresponding field in the system level segment descriptor using contents of the field in the segment descriptor representation when the field in the segment descriptor representation is changed.

11. The non-transitory computer-readable medium of claim 10, wherein the JAVA programming language class comprises a constructor to create the system level segment descriptor, and instantiating the object further comprises executing the constructor, wherein the system level segment descriptor is created.

12. A non-transitory computer-readable medium storing an operating system program that, when executed by a processor, performs a method for virtual memory management comprising:
creating, for a process, a page table comprising a plurality of page descriptors by instantiating at least one JAVA programming language class comprising a representation of a page table that corresponds to a system level page table, a representation of a page descriptor that corresponds to a page descriptor in the system level page table, and a native method for updating the system level page table from the page table;
using JAVA programming language operations during execution of the process to update a page descriptor in the page table when a virtual page corresponding to the page descriptor is removed from memory and when the virtual memory is placed in memory; and
invoking the native method to update a corresponding page descriptor in the system level page table from the updated page descriptor when the page descriptor in the page table is updated.

13. The non-transitory computer-readable medium of claim 12, wherein at least one field in a page descriptor in the page table is larger than a corresponding field in the corresponding page descriptor, and wherein the native method copies only relevant bits of the field in the page descriptor in the page table into the corresponding field in the corresponding page descriptor.

14. The non-transitory computer-readable medium of claim 13, wherein a pack instruction is executed to copy the relevant bits of the field to the corresponding field.

* * * * *